(12) United States Patent
Camyre et al.

(10) Patent No.: US 11,363,200 B2
(45) Date of Patent: **\*Jun. 14, 2022**

(54) TECHNIQUES TO COMPENSATE FOR MOVEMENT OF SENSORS IN A VEHICLE

(71) Applicant: TUSIMPLE, INC., San Diego, CA (US)

(72) Inventors: Alan Camyre, Tucson, AZ (US); Todd Skinner, San Diego, CA (US); Juexiao Ning, Tucson, AZ (US); Qiwei Li, Tucson, AZ (US); Yishi Liu, Tucson, AZ (US)

(73) Assignee: TUSIMPLE, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/025,257

(22) Filed: Sep. 18, 2020

(65) Prior Publication Data

US 2021/0075966 A1 Mar. 11, 2021

Related U.S. Application Data

(63) Continuation of application No. 16/565,331, filed on Sep. 9, 2019, now Pat. No. 10,798,303.

(51) Int. Cl.
*H04N 5/232* (2006.01)
*G05D 1/02* (2020.01)
(Continued)

(52) U.S. Cl.
CPC .......... *H04N 5/23267* (2013.01); *G01B 7/14* (2013.01); *G01B 11/14* (2013.01); *G01B 17/00* (2013.01);
(Continued)

(58) Field of Classification Search
CPC ... H04N 5/23267; G01S 17/931; G01S 17/86; G01S 7/4972; G01S 17/06; G01B 11/14;
(Continued)

(56) References Cited

U.S. PATENT DOCUMENTS

| 2018/0284243 A1 | 10/2018 | Wood |
| 2019/0163201 A1 | 5/2019 | Jensen et al. |
| 2020/0055357 A1* | 2/2020 | Laine ............... B62D 13/06 |

OTHER PUBLICATIONS

Extended European Search Report for European Patent Application No. 20194911.2, dated Dec. 21, 2020.

\* cited by examiner

*Primary Examiner* — Nam D Pham
(74) *Attorney, Agent, or Firm* — Paul Liu; Perkins Coie, LLP

(57) ABSTRACT

Techniques are described for compensating for movements of sensors. A method includes receiving two sets of sensor data from two sets of sensors, where a first set of sensors are located on a roof of a cab of a semi-trailer truck and a second set of sensor data are located on a hood of the semi-trailer truck. The method also receives from a height sensor a measured value indicative of a height of the rear of a rear portion of the cab of the semi-trailer truck relative to a chassis of the semi-trailer truck, determines two correction values, one for each of the two sets of sensor data, and compensates for the movement of the two sets of sensors by generating two sets of compensated sensor data. The two sets of compensated sensor data are generated by adjusting the two sets of sensor data based on the two correction values.

20 Claims, 3 Drawing Sheets

(51) Int. Cl.
*G01B 7/14* (2006.01)
*G01B 11/14* (2006.01)
*G01B 17/00* (2006.01)
*G01S 17/06* (2006.01)
*G01S 7/497* (2006.01)
*G01S 17/86* (2020.01)
*G01S 17/931* (2020.01)
*B60G 17/015* (2006.01)
*B60G 17/052* (2006.01)

(52) U.S. Cl.
CPC ............ *G01S 7/4972* (2013.01); *G01S 17/06* (2013.01); *G01S 17/86* (2020.01); *G01S 17/931* (2020.01); *G05D 1/0212* (2013.01); *G05D 1/0231* (2013.01); *B60G 17/0155* (2013.01); *B60G 17/052* (2013.01); *B60G 2202/152* (2013.01); *B60G 2300/02* (2013.01); *B60G 2400/252* (2013.01); *B60G 2500/324* (2013.01)

(58) Field of Classification Search
CPC ........ G01B 17/00; G01B 7/14; G05D 1/0212; G05D 1/0231; B60G 17/0155; B60G 2400/252; B60G 17/052; B60G 2300/02; B60G 2202/152; B60G 2500/324
See application file for complete search history.

TECHNIQUES TO COMPENSATE FOR MOVEMENT OF SENSORS IN A VEHICLE

CROSS-REFERENCES TO RELATED APPLICATIONS

This patent application is a continuation of U.S. patent application Ser. No. 16/565,331, titled "TECHNIQUES TO COMPENSATE FOR MOVEMENT OF SENSORS IN A VEHICLE," filed on Sep. 9, 2019, the disclosure of which is hereby incorporated by reference in its entirety.

TECHNICAL FIELD

This document relates to systems, apparatus, and methods to compensate for sensor misalignment due to a vehicle's movements.

BACKGROUND

Autonomous vehicle navigation is a technology that can allow a vehicle to sense the position and movement of vehicles around an autonomous vehicle and, based on the sensing, control the autonomous vehicle to safely navigate towards a destination. A vehicle can operate autonomously based on data obtained from multiple sensors located on the vehicle. An autonomous vehicle may operate in several modes. In some cases, an autonomous vehicle may allow a driver to operate the autonomous vehicle as a conventional vehicle by controlling the steering, throttle, clutch, gear shifter, and/or other devices. In other cases, a driver may engage the autonomous vehicle navigation technology to allow the vehicle to be driven by itself.

SUMMARY

When a vehicle is driven, sensors mounted on a roof area of the vehicle may move different from sensors mounted on a hood of the vehicle. For example, in a semi-trailer truck, cameras mounted on top of a cab area may move different from the LiDAR sensors mounted on the hood of the semi-trailer truck. This patent document describes apparatus and methods to measure a height of a semi-trailer truck's cab relative to a chassis to which the cab is coupled via an air suspension system. Based on the measured height, the apparatus and methods can apply a first correction value to sensor data obtained by a first set of sensors located on a roof of the cab and a second correction value to sensor data obtained by a second set of sensors located on a hood of the semi-trailer truck.

An exemplary compensation method, comprises receiving, from a first set sensors, a first set of sensor data of an area towards which a semi-trailer truck is being driven, where the first set of sensors are located on a roof of a cab of a semi-trailer truck; receiving, from a second set sensors, a second set of sensor data of the area, where the second set of sensors are located on a hood of the semi-trailer truck; receiving, from a height sensor, a measured value indicative of a height of a rear portion of a cab of a semi-trailer truck relative to a chassis of the semi-trailer truck, where the height sensor is located at the rear portion of the cab; determining, based on the measured value, a first correction value for the first set of sensor data and a second correction value for the second set of sensor data; and compensating for movements of the first set of sensors and the second set of sensors by generating a first set of compensated sensor data and a second set of the compensated sensor data, where the first set of compensated sensor data is generated by adjusting the first set of sensor data based on the first correction value and where the second set of compensated sensor data is generated by adjusting the second set of sensor data based on the second correction value.

In some embodiments, the height sensor is located adjacent to air springs that are coupled to the rear portion of the cab of the semi-trailer truck. In some embodiments, the first set of sensors and the second set of sensors move in opposite directions in response to receiving a physical stimulus. In some embodiments, the first set of sensors to move upward relative to a plane formed by a chassis of the semi-trailer truck and the second set of sensors to move downward relative to the plane formed by the chassis, and the first set of sensors to move downward relative to the plane formed by the chassis and the second set of sensors to move upward relative to the plane formed by the chassis.

In some embodiments, the first correction value includes a first symbol to indicate that first set of sensors moved upward relative to the plane formed by the chassis and the second correction value includes a second symbol to indicate that the second set of sensors moved downward relative to the plane formed by the chassis, the first correction value includes the second symbol to indicate that the first set of sensors moved downward relative to the plane and the second correction value includes the first symbol to indicate that the second set of sensors moved upward relative to the plane formed by the chassis, and the first symbol is different from the second symbol.

In some embodiments, the height sensor includes an ultrasonic distance sensor, a laser distance sensor, a linear potentiometer, or a rotary potentiometer. In some embodiments, the first correction value and the second correction value are determined based on an equation or a pre-determined table. In some embodiments, the first set of sensors include a plurality of cameras and the first set of sensor data includes camera images, and the second set of sensors include a plurality of light detection ranging (LiDAR) sensors and the second set of sensor data includes LiDAR data.

In yet another exemplary aspect, the above-described method is embodied in a non-transitory computer readable program stored on a non-transitory computer readable media. The computer readable program includes code that when executed by a processor, causes the processor to perform the methods described in this patent document.

In yet another exemplary embodiment, a device that is configured or operable to perform the above-described methods is disclosed.

In yet another exemplary embodiment, a system for compensating for movement of sensors includes a computer that includes a processor configured to perform the above described methods is disclosed.

The above and other aspects and their implementations are described in greater detail in the drawings, the descriptions, and the claims.

DETAILED DESCRIPTION

Developments in autonomous driving technology have led to a development of semi-trailer truck that can be autonomously driven to deliver goods to a destination. A semi-trailer truck is a vehicle that can include a tractor unit where a driver sits in a cab and a trailer unit coupled to the tractor unit. The trailer unit may include goods that the semi-trailer truck delivers to a destination. When a semi-trailer trucks is driven in an autonomous mode, the semi-trailer truck can operate without much intervention from a human driver.

A computer located in the semi-trailer truck can operate the semi-trailer truck in an autonomous mode by controlling various system of the semi-trailer truck. For example, the computer can perform image processing on images obtained from cameras on the semi-trailer truck to determine the location of objects that surround the semi-trailer truck. Based on the image processing, the computer can safely operate the semi-trailer truck by controlling a steering angle of the steering system, a throttle amount to control the speed of the vehicle, a transmission gear, and/or a braking amount to control the extent to which the brakes are engaged.

To safely operate the semi-trailer truck in an autonomous mode, several sensors are distributed around the semi-trailer truck so that the sensors are coupled to different places on the semi-trailer truck. For example, a plurality of cameras is coupled to a roof of a cab of the semi-trailer truck (shown as 104 in FIG. 2) and a plurality of sensors (e.g., LiDARs) are coupled to the hood of the semi-trailer truck (shown as 106 in FIG. 2). Sensors located at different places on the semi-trailer truck enable a computer located in the semi-trailer truck to obtain sensor data that describes different regions (e.g., front, rear, side) of an environment in which the semi-trailer truck is being driven. However, as further explained in FIG. 1, at least one technical problem created by the distribution of sensors is that one sensor located on a roof of a cab can move differently compared to another sensor located on a hood when the semi-trailer truck is driven. Since the driving operations of the semi-trailer truck is dependent at least in part on the signal processing of the data obtained by the sensors, the computer can employ compensation techniques to the sensor data to compensate for the movements of the sensors located on the cab and hood of the semi-trailer truck.

Figure 1:
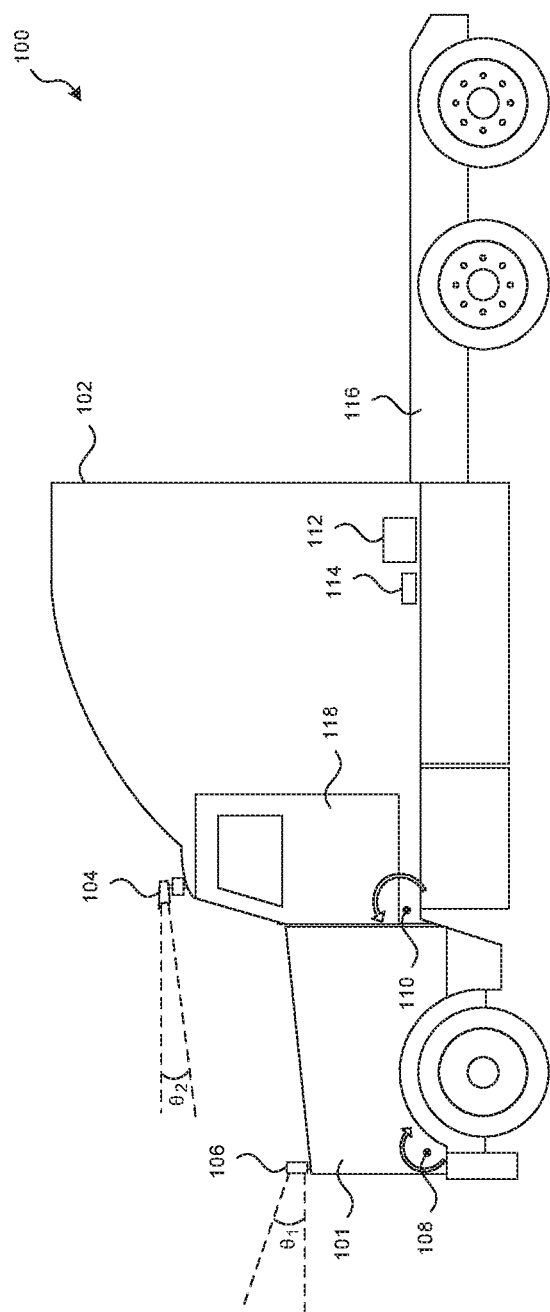
FIG. 1 shows a side view of a semi-trailer truck in a scenario where the air suspension system decompresses.

FIG. 1 shows a side view of a semi-trailer truck 100 in a scenario where the air suspension system decompresses. A semi-trailer truck 100 includes a cab 102 where a driver can sit or rest. The cab 102 includes a roof to which a plurality of cameras 104 can be mounted. For simplicity, a single camera 104 is shown in FIG. 1. The semi-trailer truck 100 also includes a plurality of LiDAR sensors 106 that can be coupled to the hood 101. In some embodiments, one LiDAR sensor can be located on the driver side of the hood, which is the side shown in FIG. 2, and another LiDAR can be located on the passenger side of the hood.

A front portion of the hood 101 is attached with a pivoting mount 108 to a chassis 116 of the semi-trailer truck. A rear portion of the hood 101 is coupled to a front region of the cab 102. For example, a latch can couple the rear portion of the hood 101 to the front region of the cab 102 near the door 118. The front of the cab 102 is attached with a pivoting mount 110 to the chassis 116. The rear of the cab 102 is suspended on or coupled to air springs of a suspension system 112. The suspension system 112 include air springs that can dampen the effect of vibrations as the semi-trailer truck 100 is driven on a road.

The result of this mounting strategy is that when the air springs in the air suspension system 112 decompress (e.g., when the semi-trailer truck goes through a pothole), the cab 102 pitches forward while the hood 101 pitches rearward as shown with the directional arrows on top of the pivoting mounts 108, 110. When the cab 102 pitches forward and the hood 101 pitches rearward, the position of the plurality of camera 104 may change by an angle relative to the horizon (shown as $\theta_2$ in FIG. 1) and the position of the LiDAR sensors 106 may change by another angle relative to the horizon (shown as $\theta_1$ in FIG. 1). Thus, the decompressed air springs can cause at least the plurality of cameras 104 to pitch downwards relative to an imaginary plane formed by the chassis 116 (or more counter-clockwise relative to pivoting mount 110) and the LiDAR sensors 106 to pitch upwards relative to the imaginary plane formed by the chassis 116 (or move clockwise relative to pivoting mount 108). When the air springs compress (e.g., when the truck hits a bump), the cab 102 pitches rearward while the hood 101 pitches forward. Thus, the compressed air springs can cause at least the plurality of cameras 104 to pitch upwards relative to the imaginary plane formed by the chassis 116 and the LiDAR sensors 106 to pitch downwards relative to the imaginary plane formed by the chassis 116.

The result of the movements of the hood 101 and the cab 102 is that the positions of the sensors mounted to the hood 101 and cab 102 can be become misaligned relative to each other or even compared to the position of the sensors when the semi-trailer truck 100 does not experience much vibrations (e.g., when the semi-trailer truck is parked or stopped). In some embodiments, cameras and/or other sensors are calibrated when the truck is turned on and is in a parked state. Thus, in such embodiments, calibration is performed when the positions of the cameras do not move much. However, when the semi-trailer truck is driven, the hood 101 and cab 102 tend to move or pivot in a direction opposite to each other, which changes the position of the sensors. When a computer located in the semi-trailer truck 100 performs signal processing on data obtained by the sensors that have moved when the air springs have compressed, the computer may determine that an object (e.g., another vehicle) in front of the semi-trailer truck 100 is closer than it is. In this scenario, the computer may instruct the semi-trailer truck 100 to engage its brakes unnecessarily.

To correct the effect of sensor position misalignment, a height sensor 114 can be located adjacent to the air suspension system 112 (e.g., adjacent to the air springs) to measure the height of the rear of the cab 102 relative to the chassis 116. For example, the height sensor 114 can be located at or near the rear of the cab 102 to provide maximum measurement resolution while measuring the height of the rear of the cab 102 relative to the chassis 116. Given the mounting of the hood and the cab to the chassis and to each other, a single height sensor 114 can be used to measure the height of the rear of the cab 102 relative to the chassis 116, where a computer can use the measured height to determine correction values for both the LiDAR sensors 106 coupled to the hood 101 and the plurality of cameras 104 coupled to the cab 102. The height sensor 114 may be an ultrasonic distance sensor, a laser distance sensor, a linear potentiometer, or a rotary potentiometer.

Figure 2:
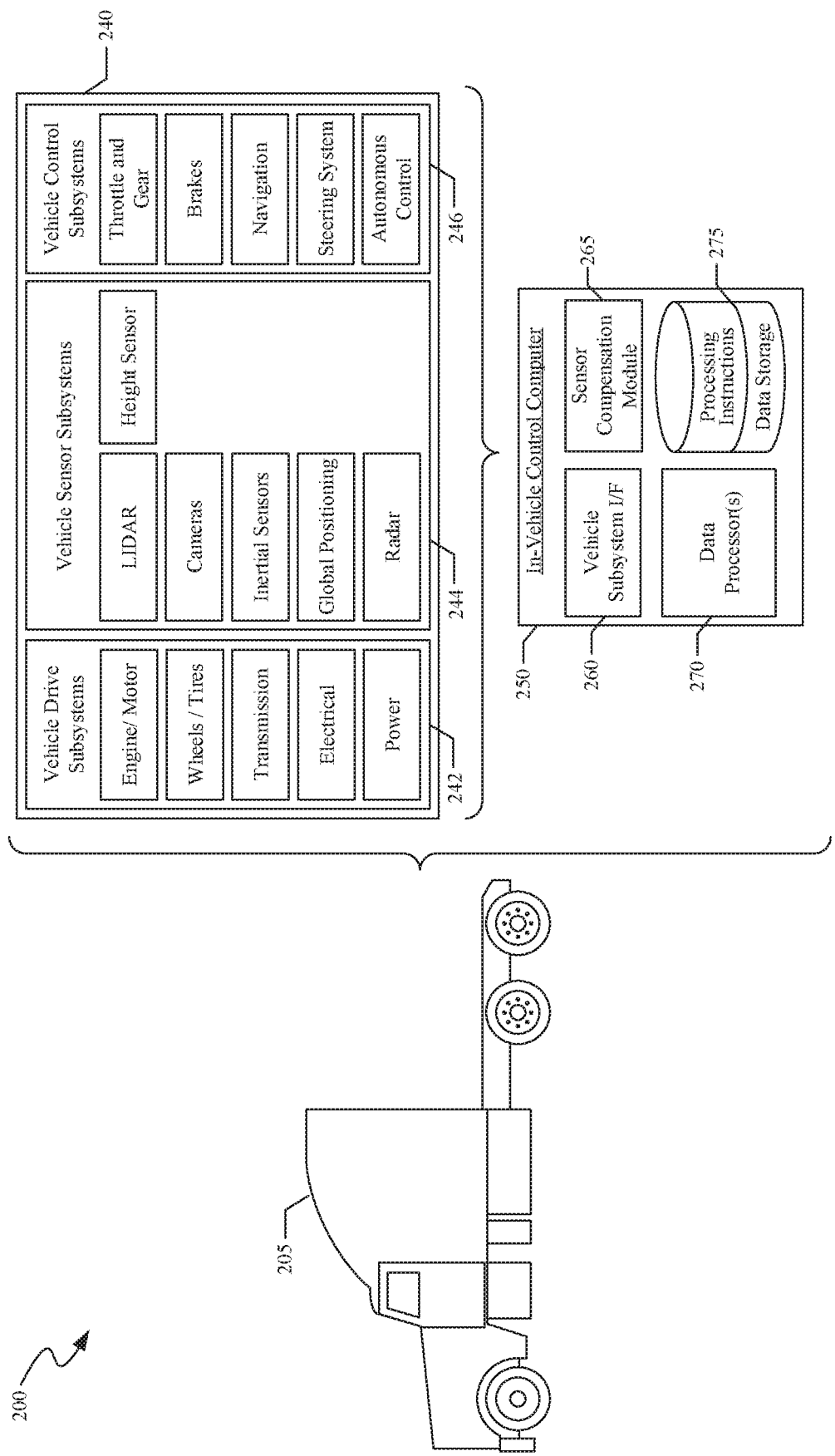
FIG. 2 shows a block diagram of an example vehicle ecosystem in which correction values for sensors can be determined based on a measured height of a semi-trailer truck's cab relative to a chassis of the semi-trailer truck.
Figure 3:
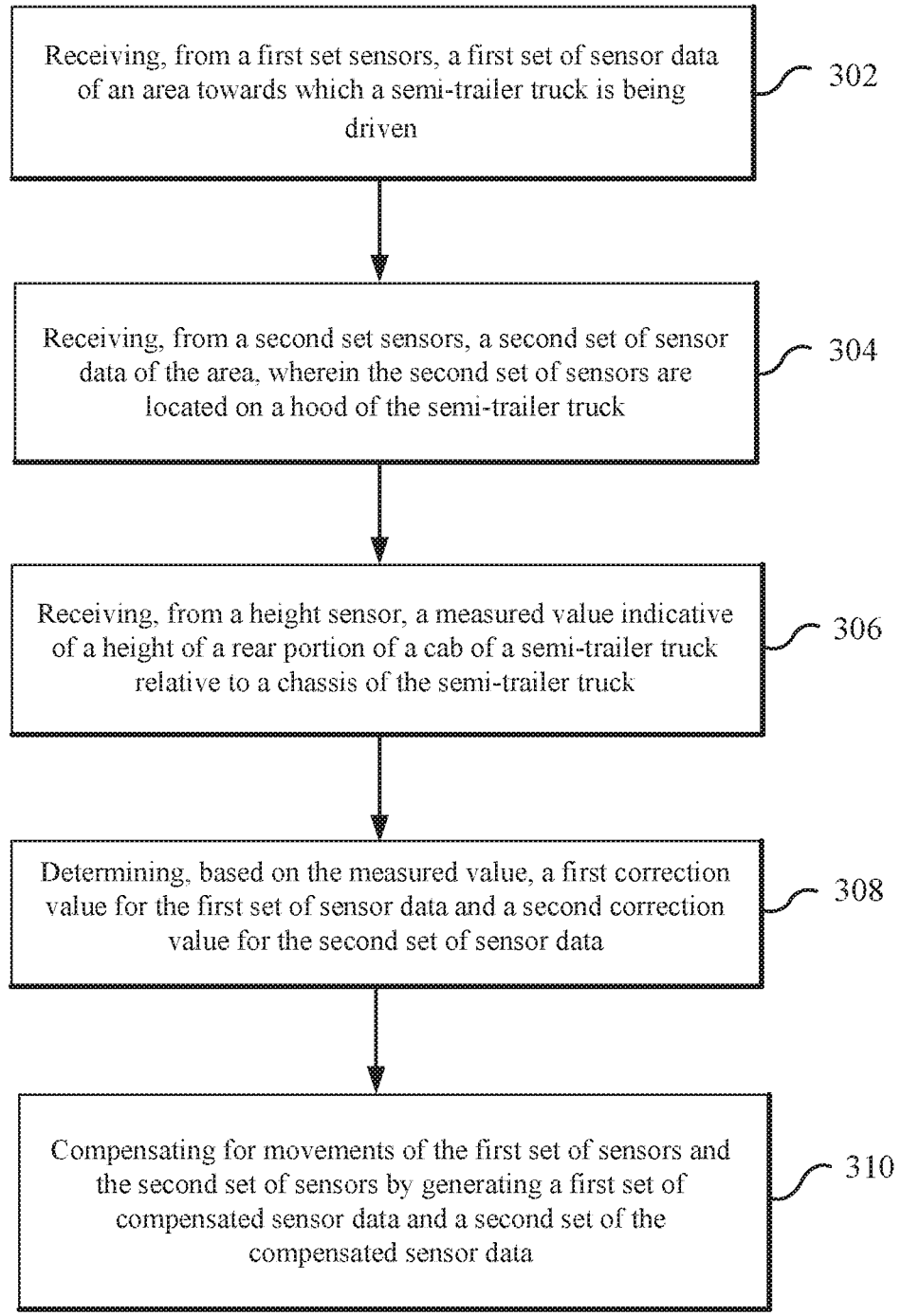
FIG. 3 shows a flow diagram to determine and use two correction values for two sets of sensors located on a vehicle.

As further described in FIGS. 2 and 3, based on the measured height value, the obtained correction values can be used to process the sensor data obtained by the plurality of cameras 104 and the LiDAR sensors 106. Thus, the correction values can be used to compensate for the misalignment between sensors in real-time.

FIG. 2 shows a block diagram of an example vehicle ecosystem 200 in which correction values for sensors can be determined based on a measured height of a semi-trailer truck's cab relative to a chassis of the semi-trailer truck. An in-vehicle control computer 250 is located in the semi-trailer truck 205 and can be in data communication with a plurality of vehicle subsystems 240, all of which can be resident in the semi-trailer truck 205. A vehicle subsystem interface 260 is provided to facilitate data communication between the in-vehicle control computer 250 and the plurality of vehicle subsystems 240.

The semi-trailer truck 205 may include various vehicle subsystems that support of the operation of semi-trailer truck 205. The vehicle subsystems may include a vehicle drive subsystem 242, a vehicle sensor subsystem 244, and/or a vehicle control subsystem 246. The components or devices of the vehicle drive subsystem 242, the vehicle sensor subsystem 244, and the vehicle control subsystem 246 as shown as examples. In some embodiment, additional components or devices can be added to the various subsystems or one or more components or devices (e.g., Radar shown in FIG. 2) can be removed without affecting the sensor misalignment compensation techniques described in this patent document. The vehicle drive subsystem 242 may include components operable to provide powered motion for the semi-trailer truck 205. In an example embodiment, the vehicle drive subsystem 242 may include an engine or motor, wheels/tires, a transmission, an electrical subsystem, and a power source.

The vehicle sensor subsystem 244 may include a number of sensors configured to sense information about an environment or condition of the semi-trailer truck 205. The vehicle sensor subsystem 244 includes a height sensor that can measure a height of the rear of the cab relative to the semi-trailer truck's chassis.

In FIG. 2, the vehicle subsystem interface 260 of the in-vehicle control computer 250 can include a wireless receiver and/or a CAN controller that can receive signals transmitted or sent by the height sensor and send the measured height value in the received signal to the sensor compensation module 265 for further processing. The sensor compensation module 265 receives from the height sensor a measured height value that indicate a position of the cab relative to a position of the chassis.

The sensor compensation module 265 can use a pre-determined table (as shown in Table 1 below) or an equation to determine a first correction value for a first set of sensors (e.g., cameras) located on the roof of the cab of the semi-trailer truck 205 and a second correction value for a second set of sensors (e.g., LiDAR sensors) located on the hood of the semi-trailer truck 205 based on the measured height value. For example, as shown in Table 1, the sensor compensation module 265 can determine a change in the cab height (Δ Cab Height) by subtracting the measured height value from a pre-determined height of a cab when the cab is in a rest position and not subjected to any movements. Based on the measured height value, the sensor compensation module 265 can determine the first correction value for the first set of sensors to be a value from the Δ Cab Angle column corresponding to a value from the Δ Cab Height column; and the sensor compensation module 265 can determine the second correction value for the second set of sensors to be a value from the Δ LiDAR Angle column corresponding to a value from the Δ Cab Height column.

TABLE 1

Pre-Determined Correction Values for Sensors

| Δ Cab Height | Δ Cab Angle | Δ LiDAR Angle | Relative Angle |
|---|---|---|---|
| 2.188 | 1.20 | −0.20 | 1.40 |
| 1.688 | 1.00 | −0.20 | 1.20 |
| 1.438 | 0.70 | −0.10 | 0.80 |
| 1.063 | 0.50 | 0.00 | 0.50 |
| 0.813 | 0.50 | 0.00 | 0.50 |
| 0.563 | 0.40 | 0.00 | 0.40 |
| 0.313 | 0.20 | 0.00 | 0.20 |
| 0.000 | 0.00 | 0.00 | 0.00 |
| −0.063 | 0.00 | 0.10 | −0.10 |
| −0.313 | 0.00 | 0.10 | −0.10 |
| −0.688 | −0.40 | 0.20 | −0.60 |
| −0.938 | −0.50 | 0.20 | −0.70 |
| −1.313 | −0.50 | 0.30 | −0.80 |

In some embodiments, an exemplary equation can be $C=(0.638*H)$, where C is the correction factor (in degrees), and H is the measured cab height (in inches).

In some embodiments, the first and second correction values can include a symbol (e.g., "+" or "−" indicators) to indicate whether the sensors have moved upward or downward relative to an imaginary plane formed by the chassis of the semi-trailer truck. For example, if the cameras located on the roof of the cab moved upward relative to the plane formed by the chassis, then the first correction value includes a first symbol (e.g., "+") to indicate that the cameras moved upward, and if the LiDAR sensors move downward relative to the plane formed by the chassis, then the second correction value includes a second symbol (e.g., "−") to indicate that the second set of sensors moved downward. The first symbol can be different from the second symbol because the cameras on the roof of the cab and LiDAR sensors on the hood tend to move in opposite directions. Continuing with the above example, if the cameras located on the roof of the cab moved downward relative to the plane formed by the chassis, then the first correction value includes the second symbol (e.g., "−") to indicate that the cameras moved downward, and if the LiDAR sensors move upward relative to the plane formed by the chassis, then the second correction value includes the first symbol (e.g., "+") to indicate that the second set of sensors moved upward.

The first and second correction values can be used by the sensor compensation module 265 to adjust or shift the images taken by the cameras to obtain compensated image data and to adjust or shift the data from the point cloud measured and/or created by the LiDAR sensors to obtain compensated point cloud data. For example, referring to Table 1 above, if sensor compensation module 265 determines that the Δ Cab Height is 1.438, then the sensor compensation module 265 can perform an angular shift or vertical shift or horizontal shift by shifting the images obtained by the cameras by −0.70 and by shifting the point cloud obtained by the LiDAR sensors by +0.10 to compensate for the change in the angles of the sensors. This shift can bring both datasets into alignment to create a more accurate map of the vehicle's surroundings. In some embodiments, the sensor compensation module 265 can perform the angular shift on the point cloud data or the pixels of an image.

Returning to the vehicle sensor subsystem 244, in some embodiments the vehicle sensor subsystem 244 may also include an inertial measurement unit (IMU), a Global Positioning System (GPS) transceiver, a RADAR unit, a laser range finder/LiDAR unit, and/or cameras or image capture devices. The vehicle sensor subsystem 244 may also include sensors configured to monitor internal systems of the semi-trailer truck 205 (e.g., an $O_2$ monitor, a fuel gauge, an engine oil temperature).

The IMU may include any combination of sensors (e.g., accelerometers and gyroscopes) configured to sense position and orientation changes of the semi-trailer truck 205 based on inertial acceleration. The GPS transceiver may be any sensor configured to estimate a geographic location of the semi-trailer truck 205. For this purpose, the GPS transceiver may include a receiver/transmitter operable to provide information regarding the position of the semi-trailer truck 205 with respect to the Earth. The RADAR unit may represent a system that utilizes radio signals to sense objects within the local environment of the semi-trailer truck 205. In some embodiments, in addition to sensing the objects, the RADAR unit may additionally be configured to sense the speed and the heading of the objects proximate to the semi-trailer truck 205. The laser range finder or LiDAR unit may be any sensor configured to sense objects in the environment in which the semi-trailer truck 205 is located using lasers. The cameras may include devices configured to capture a plurality of images of the environment of the semi-trailer truck 205. The cameras may be still image cameras or motion video cameras.

Many or all of the functions of the semi-trailer truck 205 can be controlled by the in-vehicle control computer 250. The in-vehicle control computer 250 may include at least one data processor 270 (which can include at least one microprocessor) that executes processing instructions stored in a non-transitory computer readable medium, such as the data storage device 275 or memory. The in-vehicle control computer 250 may also represent a plurality of computing devices that may serve to control individual components or subsystems of the semi-trailer truck 205 in a distributed fashion. In some embodiments, the data storage device 275 may contain processing instructions (e.g., program logic) executable by the data processor 270 to perform various methods and/or functions of the semi-trailer truck 205, including those described for the sensor compensation module 265 as explained in this patent document. For instance, the data processor 270 executes the operations associated with sensor compensation module 265 for determining the correction values based on a measured height of the rear of the cab relative to the chassis, and for using the correction values to compensate the sensor data obtained from misaligned sensors.

The data storage device 275 may contain additional instructions as well, including instructions to transmit data to, receive data from, interact with, or control one or more of the vehicle drive subsystem 242, the vehicle sensor subsystem 244, and the vehicle control subsystem 246. The in-vehicle control computer 250 can be configured to include a data processor 270 and a data storage device 275. The in-vehicle control computer 250 may control the function of the semi-trailer truck 205 based on inputs received from various vehicle subsystems (e.g., the vehicle drive subsystem 242, the vehicle sensor subsystem 244, and the vehicle control subsystem 246).

FIG. 3 shows a flow diagram to determine and use two correction values for two sets of sensors located on a vehicle. At the receiving operation 302, an in-vehicle control computer receives, from a first set sensors, a first set of sensor data of an area towards which a semi-trailer truck is being driven. The first set of sensors can be located on a roof of a cab of a semi-trailer truck. At the receiving operation 304, the in-vehicle control computer receives, from a second set sensors, a second set of sensor data of the area. The second set of sensors can be located on a hood of the semi-trailer truck. In some embodiments, the first set of sensors include a plurality of cameras and the first set of sensor data includes camera images, and the second set of sensors include a plurality of light detection ranging (LiDAR) sensors and the second set of sensor data includes LiDAR data.

At the receiving operation 306, the in-vehicle control computer receives, from a height sensor, a measured value indicative of a height of a rear portion of a cab of a semi-trailer truck relative to a chassis of the semi-trailer truck. The height sensor may be located at the rear portion of the cab. In some embodiments, the height sensor is located adjacent to air springs that are coupled to the rear portion of the cab of the semi-trailer truck. In some embodiments, the height sensor includes an ultrasonic distance sensor, a laser distance sensor, a linear potentiometer, or a rotary potentiometer.

At the determining operation 308, the in-vehicle control computer determines, based on the measured value, a first correction value for the first set of sensor data and a second correction value for the second set of sensor data. In some embodiments, the first correction value and the second correction value are determined based on an equation or a pre-determined table.

At the compensating operation 310, the in-vehicle control computer compensates for movements of the first set of sensors and the second set of sensors by generating a first set of compensated sensor data and a second set of the compensated sensor data. The first set of compensated sensor data is generated by adjusting (e.g., shifting) the first set of sensor data based on the first correction value and the second set of compensated sensor data is generated by adjusting (e.g., shifting) the second set of sensor data based on the second correction value.

In some embodiments, the first set of sensors and the second set of sensors move in opposite directions in response to receiving a physical stimulus (e.g., compression or decompression of the air springs or of a component of the suspension system). In some embodiments, the first set of sensors to move upward relative to a plane formed by a chassis of the semi-trailer truck and the second set of sensors to move downward relative to the plane formed by the chassis, and the first set of sensors to move downward relative to the plane formed by the chassis and the second set of sensors to move upward relative to the plane formed by the chassis.

In some embodiments, the first correction value includes a first symbol to indicate that first set of sensors moved upward relative to the plane formed by the chassis and the second correction value includes a second symbol to indicate that the second set of sensors moved downward relative to the plane formed by the chassis, the first correction value includes the second symbol to indicate that the first set of sensors moved downward relative to the plane and the second correction value includes the first symbol to indicate that the second set of sensors moved upward relative to the plane formed by the chassis, and the first symbol is different from the second symbol. The operations described in FIG. 3 can be performed by a sensor compensation module 265 of an in-vehicle control computer as described in FIG. 2.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method, comprising:
   receiving, from a first sensor located on a cab of a semi-trailer truck, a first sensor data, wherein the first sensor is rotatable relative to a first pivot of a chassis of the semi-trailer truck;
   receiving, from a second sensor located on a hood of the semi-trailer truck, a second sensor data, wherein the second sensor is rotatable relative to a second pivot of the chassis, a position of the second pivot being different from a position of the first pivot;
   receiving, from a height sensor located at a rear portion of the cab, a measured value indicative of a height of the rear portion of the cab relative to the chassis; and
   correcting or compensating for movements of or misalignment between the first sensor and the second sensor by calibrating the first sensor data and the second sensor data based on the measured value.

2. The method of claim 1, wherein the height sensor is located adjacent to air springs that are coupled to the rear portion of the cab.

3. The method of claim 1, wherein the first sensor and the second sensor move in opposite directions in response to receiving a physical stimulus.

4. The method of claim 1,
   wherein the first sensor moves upward relative to a plane formed by the chassis and the second sensor moves downward relative to the plane, and
   wherein the first sensor moves downward relative to the plane and the second sensor moves upward relative to the plane.

5. The method of claim 1, wherein calibrating the first sensor data and the second sensor data, comprises:
   determining, based on the measured value, a first correction value for the first sensor data and a second correction value for the second sensor data; and
   compensating for movements of the first sensor and the second sensor by generating a first compensated sensor data and a second compensated sensor data,
     wherein the first compensated sensor data is generated by adjusting the first sensor data based on the first correction value and
     wherein the second compensated sensor data is generated by adjusting the second sensor data based on the second correction value.

6. The method of claim 5,
   wherein the first correction value comprises a first symbol to indicate that the first sensor moves upward relative to a plane formed by the chassis and the second correction value comprises a second symbol different from the first symbol, to indicate that the second sensor moves downward relative to the plane, and
   wherein the first correction value comprises the second symbol to indicate that the first sensor moves downward relative to the plane and the second correction value comprises the first symbol to indicate that the second sensor moves upward relative to the plane.

7. The method of claim 5, wherein the first correction value and the second correction value are determined based on an equation or a pre-determined table.

8. The method of claim 5, wherein a first height is a pre-determined height of the cab when the cab is in a rest position, a second height is a height of the cab when the semi-trailer truck is moving, wherein a change of height is determined by subtracting the second height from the first height, wherein the first correction value and the second correlation value are correspond to the change of height.

9. A system, comprising:
a computer comprising a processor configured to implement a method comprising:
receiving, from a first sensor located on a cab of a semi-trailer truck, a first sensor data, wherein the first sensor is rotatable relative to a first pivot of a chassis of the semi-trailer truck;
receiving, from a second sensor located on a hood of the semi-trailer truck, a second sensor data, wherein the second sensor is rotatable relative to a second pivot of the chassis, a position of the second pivot being different from a position of the first pivot;
receiving, from a height sensor located at a rear portion of the cab, a measured value indicative of a height of the rear portion of the cab relative to the chassis; and
correcting or compensating for movements of or misalignment between the first sensor and the second sensor by calibrating the first sensor data and the second sensor data based on the measured value.

10. The system of claim 9, wherein the height sensor comprises an ultrasonic distance sensor, a laser distance sensor, a linear potentiometer, or a rotary potentiometer.

11. The system of claim 9, wherein the first sensor is located on a roof of the cab, wherein the second sensor is located on a hood of the semi-trailer truck.

12. The system of claim 11, wherein a front portion of the cab is attached with a first pivoting mount to the chassis, the first pivoting mount comprising the first pivot, wherein a rear portion of the cab is suspended on or coupled to an air spring.

13. The system of claim 11, wherein a front portion of the cab is attached with a first pivoting mount to the chassis, the first pivoting mount comprising the first pivot, wherein a front portion of the hood is attached with a second pivoting mount to the chassis, the second pivoting mount comprising the second pivot.

14. The system of claim 13, wherein a latch couples a rear portion of the hood to the front portion of the cab.

15. The system of claim 9,
wherein the first sensor comprises a camera and the first sensor data comprises a camera image, and
wherein the second sensor comprises a light detection ranging (LiDAR) sensor and the second sensor data comprises LiDAR data.

16. The system of claim 9, wherein the first sensor and the second sensor move in opposite directions in response to receiving a physical stimulus, wherein one of the first sensor and the second sensor moves upward relative to a plane formed by the chassis, wherein the other one of the first sensor and the second sensor moves downward relative to the plane.

17. A non-transitory computer readable storage medium having code stored thereon, the code, when executed by a processor, causing the processor to implement a method comprising:
receiving, from a first sensor located on a cab of a semi-trailer truck, a first sensor data, wherein the first sensor is rotatable relative to a first pivot of a chassis of the semi-trailer truck;
receiving, from a second sensor located on a hood of the semi-trailer truck, a second sensor data, wherein the second sensor is rotatable relative to a second pivot of the chassis, a position of the second pivot being different from a position of the first pivot;
receiving, from a height sensor located at a rear portion of the cab, a measured value indicative of a height of the rear portion of the cab relative to the chassis; and
correcting or compensating for movements of or misalignment between the first sensor and the second sensor by calibrating the first sensor data and the second sensor data based on the measured value.

18. The non-transitory computer readable storage medium of claim 17, wherein the first sensor data comprises a camera images, the second sensor data comprises LiDAR data, wherein calibrating the first sensor data and the second sensor data, comprises:
compensating, based on the measured value, for movements of the first sensor and the second sensor by performing a shift to at least one of the camera images and the LiDAR data.

19. The non-transitory computer readable storage medium of claim 18, wherein performing the shift comprises performing an angular shift, a vertical shift, or a horizontal shift.

20. The non-transitory computer readable storage medium of claim 18, wherein after performing the shift to at least one of the camera images and the LiDAR data, the first sensor data and the second sensor data are substantially aligned.

* * * * *